(12) United States Patent
Tsai et al.

(10) Patent No.: US 11,260,958 B2
(45) Date of Patent: Mar. 1, 2022

(54) DOUBLE OVER CENTER CRANKSHAFT FLAP MECHANISM

(71) Applicant: The Boeing Company, Chicago, IL (US)

(72) Inventors: Kevin R. Tsai, Seattle, WA (US); Bryan J. Gruner, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 16/560,773

(22) Filed: Sep. 4, 2019

(65) Prior Publication Data

US 2021/0061442 A1  Mar. 4, 2021

(51) Int. Cl.
*B64C 9/02* (2006.01)
*B64C 9/18* (2006.01)
*B64C 13/30* (2006.01)

(52) U.S. Cl.
CPC ............. *B64C 9/02* (2013.01); *B64C 9/18* (2013.01); *B64C 13/30* (2013.01)

(58) Field of Classification Search
CPC .. B64C 13/30; B64C 9/02; B64C 9/04; B64C 9/16; B64C 9/18; B64C 9/20
See application file for complete search history.

(56) References Cited

U.S. PATENT DOCUMENTS

| 3,827,658 | A | 8/1974 | Hallworth | |
|---|---|---|---|---|
| 7,293,744 | B2 * | 11/2007 | Perez-Sanchez | B64C 9/22 244/211 |
| 8,511,608 | B1 * | 8/2013 | Good | B64C 9/18 244/99.3 |
| 2013/0075537 | A1 * | 3/2013 | Sakurai | B64C 9/16 244/216 |
| 2015/0191240 | A1 * | 7/2015 | Burchard | B64C 9/16 244/215 |

FOREIGN PATENT DOCUMENTS

| EP | 0937641 A2 | 8/1999 |
|---|---|---|
| EP | 2572978 A2 | 3/2013 |
| EP | 2808250 A1 | 12/2014 |
| FR | 2884222 A1 | 10/2006 |

* cited by examiner

*Primary Examiner* — Richard G Davis
(74) *Attorney, Agent, or Firm* — Felix L. Fischer

(57) ABSTRACT

A flap actuation mechanism incorporates a flap bracket attached to a flap and coupled to an underwing structure with a pivotal coupling. A crankshaft is configured for over center rotation and has aligned inboard and outboard crank arms extending from axially spaced inboard and outboard journals disposed in the underwing structure and configured to rotate about a rotation axis of the inboard and outboard journals. A crank pin is connected between the inboard and outboard crank arms. An actuating rod has a first end rotatably coupled to the crank pin and a second end coupled to the flap bracket. Rotation of the crankshaft displaces the actuating rod to cause rotation of the flap bracket and the flap.

20 Claims, 12 Drawing Sheets

DOUBLE OVER CENTER CRANKSHAFT FLAP MECHANISM

BACKGROUND INFORMATION

Field

Embodiments of the disclosure relate generally to the field of aircraft flap extension systems and, more particularly to a flap actuation system having a double over center crankshaft rotatably engaged to a flap bracket.

Background

Aircraft employ flaps which increase camber of the wings for enhanced aerodynamic efficiency in take-off and landing. Various mechanical arrangements have been developed to deploy the flaps from retracted to extended positions. Due to close operating conditions within structural elements constrained by desired aerodynamic mold lines, typical drive mechanism for flap deployment are limited in mechanical efficiency and significant complexity may be required. Actuators employing a rotating lever arm have been employed in existing drive mechanisms but are limited in range of rotation.

SUMMARY

Exemplary implementations of a flap actuation mechanism incorporate a flap bracket attached to a flap and coupled to an underwing structure with a pivotal coupling. A crankshaft is configured for over center rotation has aligned inboard and outboard crank arms extending from axially spaced inboard and outboard journals disposed in the underwing structure and configured to rotate about a rotation axis of the inboard and outboard journals. A crank pin connected between the inboard and outboard crank arms. An actuating rod has a first end rotatably coupled to the crank pin and a second end coupled to the flap bracket. Rotation of the crankshaft displaces the actuating rod to cause rotation of the flap bracket and the flap.

The implementations herein provide a method for deployment of a flap. Drive torque is provided to a crankshaft. The crankshaft rotates in a first direction to drive an actuating rod from a stowed position aligned with a rotation axis of the crankshaft. A flap bracket is rotated with the actuating rod to extend a flap.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a double over center flap deployment mechanism with a crankshaft having a pair of aligned crank arms connected to a pair of spaced-apart journals configured to rotate about an axis, and a crank pin extending between the crank arms and connected to an actuating rod such that rotation of the journals and crank arms of the crankshaft displaces the actuating rod to cause rotation of a flap bracket that is pivotally connected to a wing to rotate a flap between a stowed and deployed position.

Figure 1A:
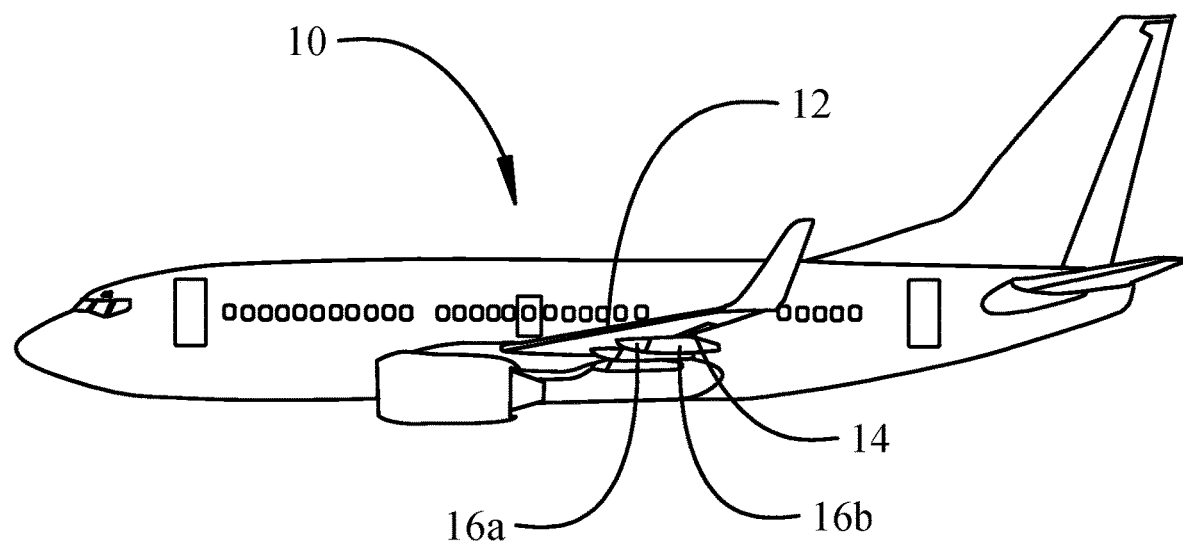
FIG. 1A is a representation of an aircraft in which the implementations disclosed herein may be employed.
Figure 1B:
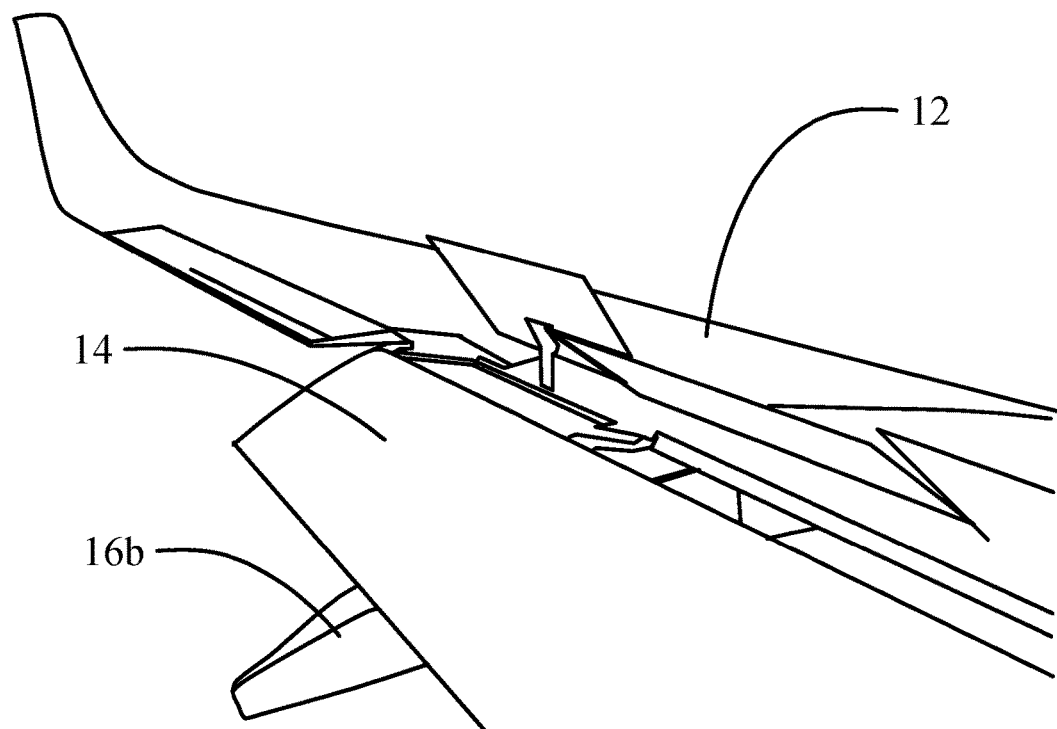
FIG. 1B is a detailed pictorial representation of the wing and flap of the aircraft of FIG. 1A.
Figure 1C:
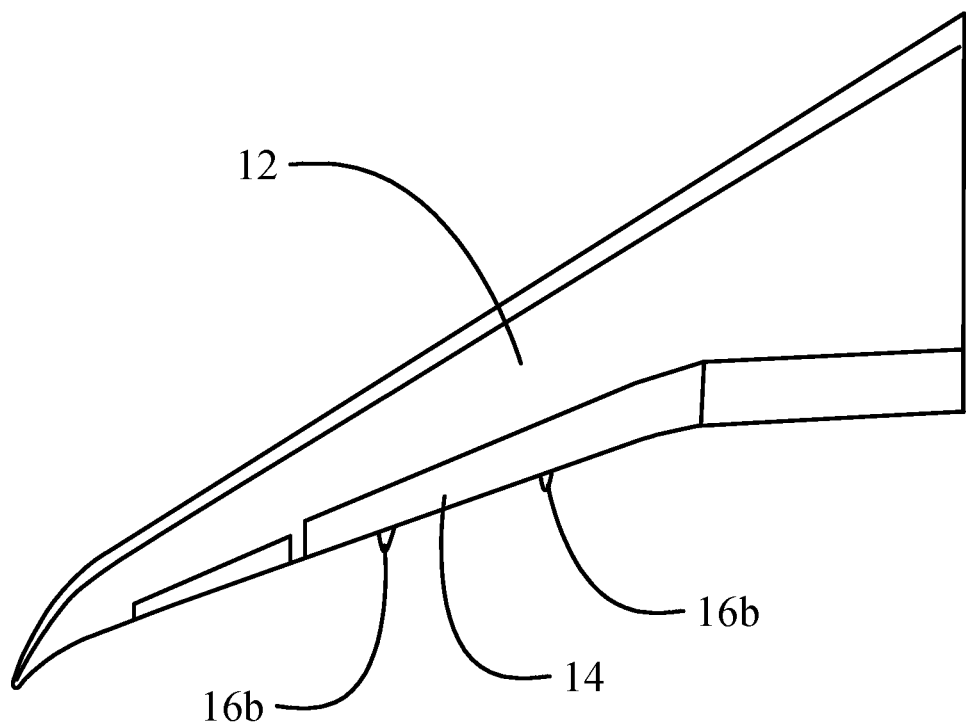
FIG. 1C is a top view of the wing and flaps of FIG. 1B.

Referring to the drawings, FIGS. 1, 1B and 1C depict an aircraft 10 having a wing 12 with a system of operating flaps 14. The flaps 14 are engaged to the wing 12 at multiple attachment points with underwing flap support elements partially housed within fixed fairings 16a and movable fairings 16b. Extension of the flaps 14 to enhance aerodynamic performance during takeoff and landing is accomplished with a trailing edge flap actuation mechanism 17 that causes the flaps 14 and movable fairings 16b to rotate downward relative to the wing 12 as seen in FIG. 1B.

Figure 2:
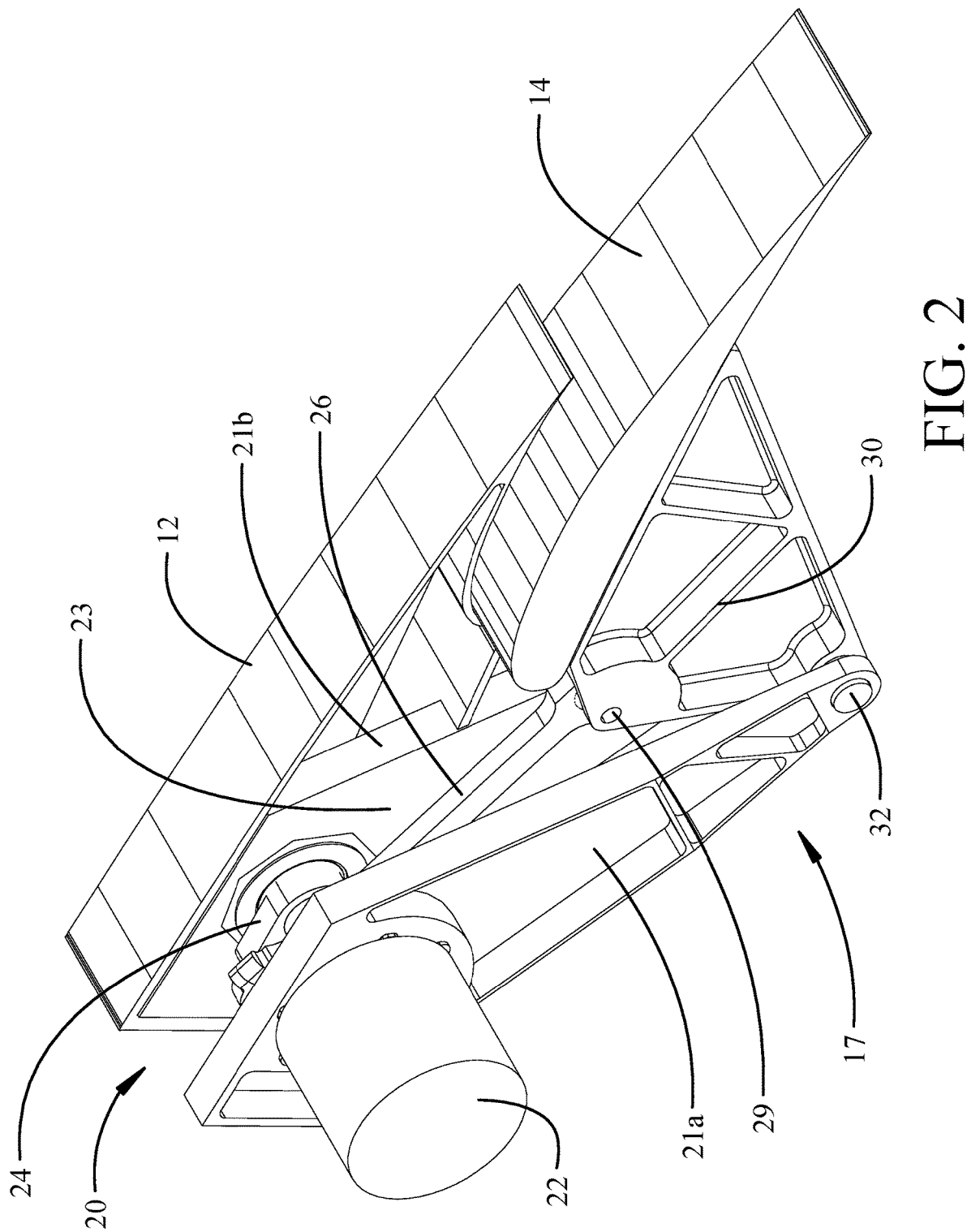
FIG. 2 is a pictorial view of an example implementation of the flap actuation system.

As seen in FIG. 2, at an example attachment point, the flap actuation mechanism 17 is supported by a flap support element such as an underwing structure 20. A rotary actuator 22 engages a crankshaft 24 (to be described in greater detail subsequently) engaging an actuating rod 26. The actuating rod 26 is rotatably attached at a first end 25 to the crankshaft and at a second end 27 with a pivot pin 29 to a flap bracket 30 mounted to the flap 14. The flap bracket 30 is coupled to the underwing structure 20 with a pivotal coupling, axle 32 in the implementation shown. As will be described in greater detail subsequently, upon rotation of the crankshaft 24 by applied drive torque from the actuator 22, actuating rod 26 is displaced and the drive torque is translated into an applied linear force to rotate the flap bracket 30 about axle 32. Upon rotation of the crankshaft 24 by the actuator 22, forward and aft movement of the actuating rod 26 causes rotation of the flap bracket 30 to extend and retract the flap 14 between a stowed position and a deployed position relative to the underwing structure 20. In the example implementation, the underwing structure 20 has an inboard rib 21a and an outboard rib 21b forming a clevis with a slot 23 through which the actuating rod 26 extends. As used herein the terms "inboard" and "outboard" are employed to describe relative positioning and other than for the specific implementations disclosed may be substituted with appropriate descriptors such as "first" and "second", "upper" and "lower" or "right" and "left". The flap bracket 30 is also received in the slot 23 between the inboard and outboard ribs 21*a* and 21*b*.

Figure 3:
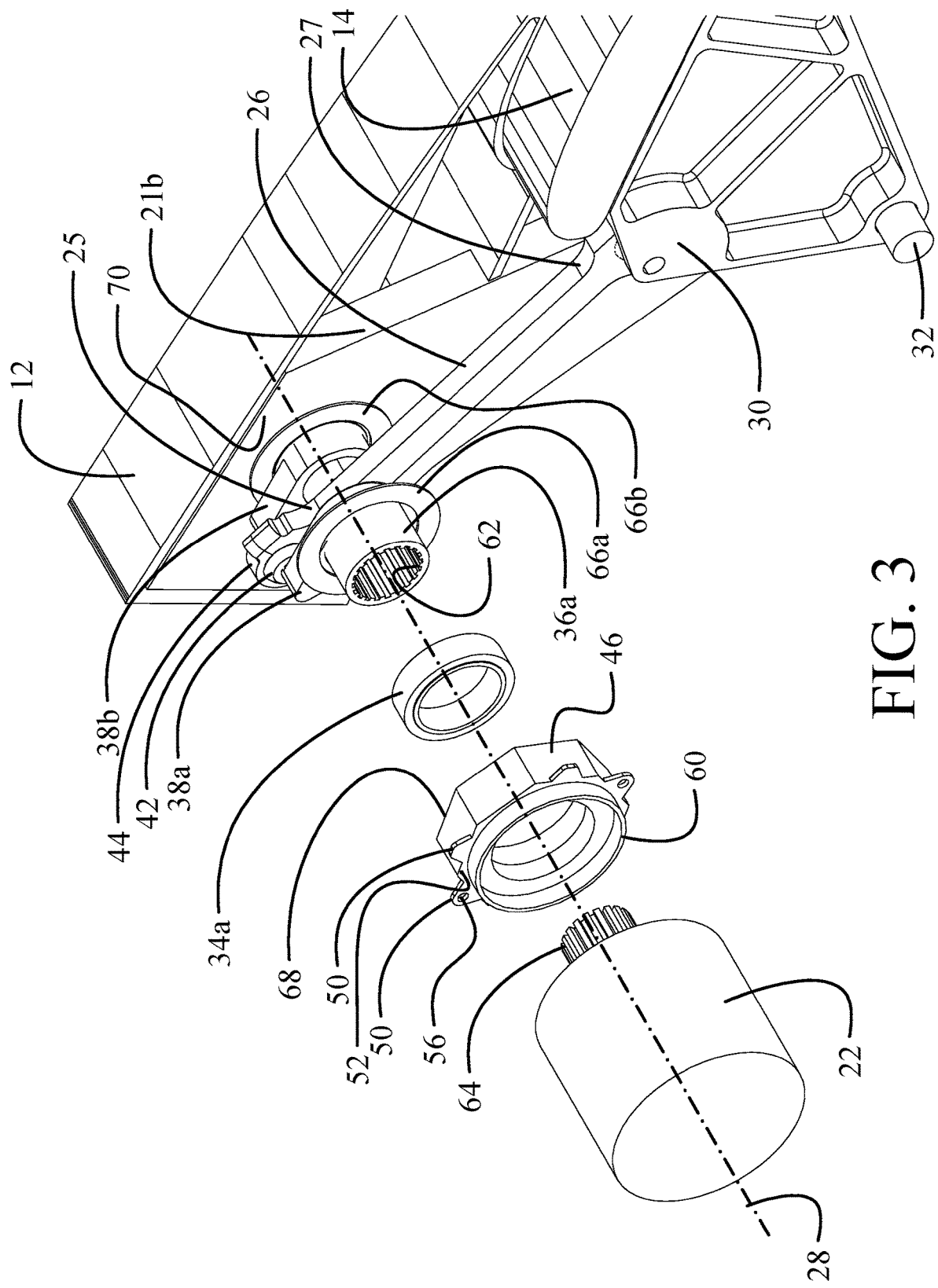
FIG. 3 is a partially exploded pictorial view of the example implementation with the inboard rib of the underwing structure removed for clarity.
Figure 4:
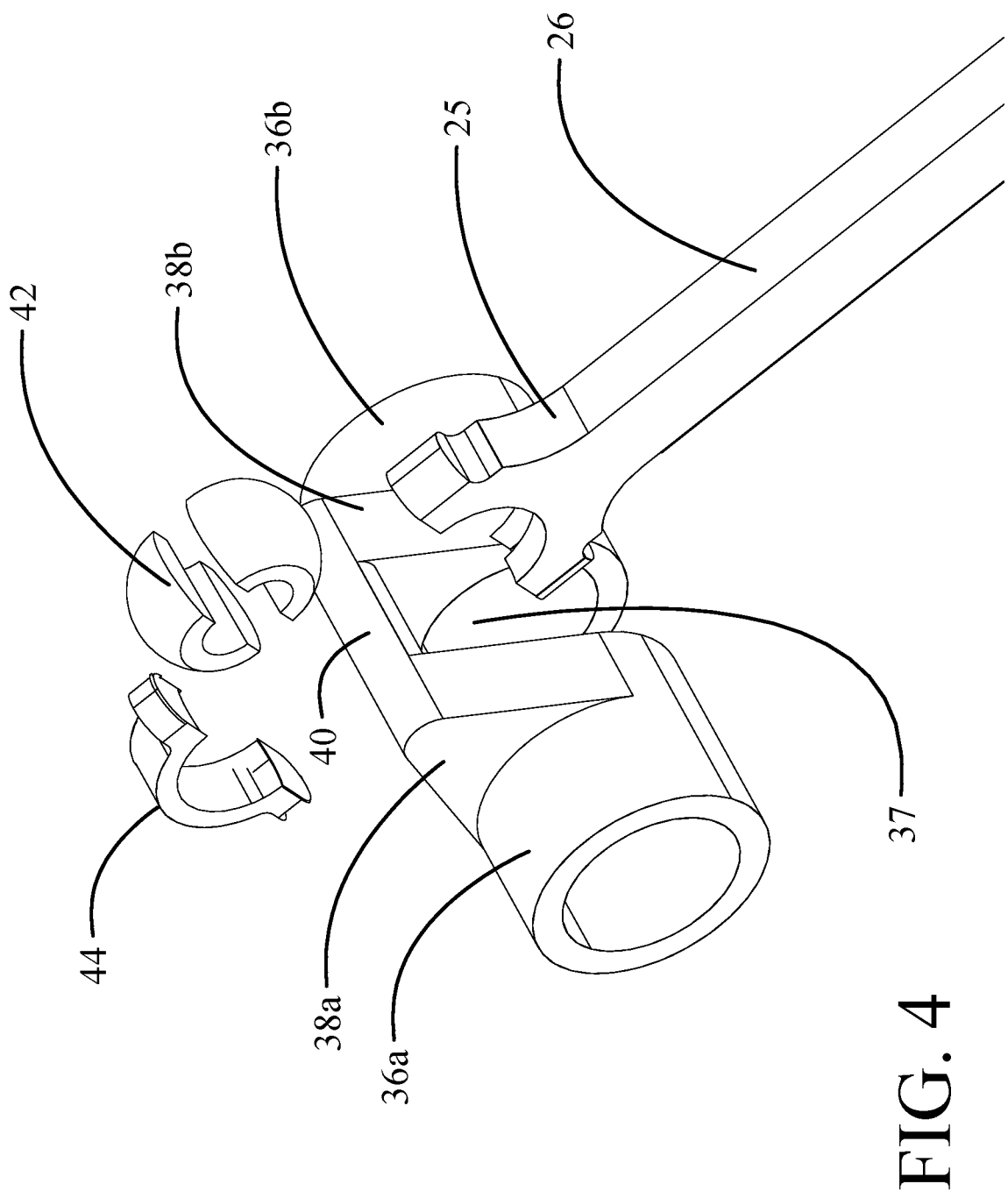
FIG. 4 is a pictorial view of the crankshaft with the rod cap and split ball bearing exploded for clarity.
Figure 5:
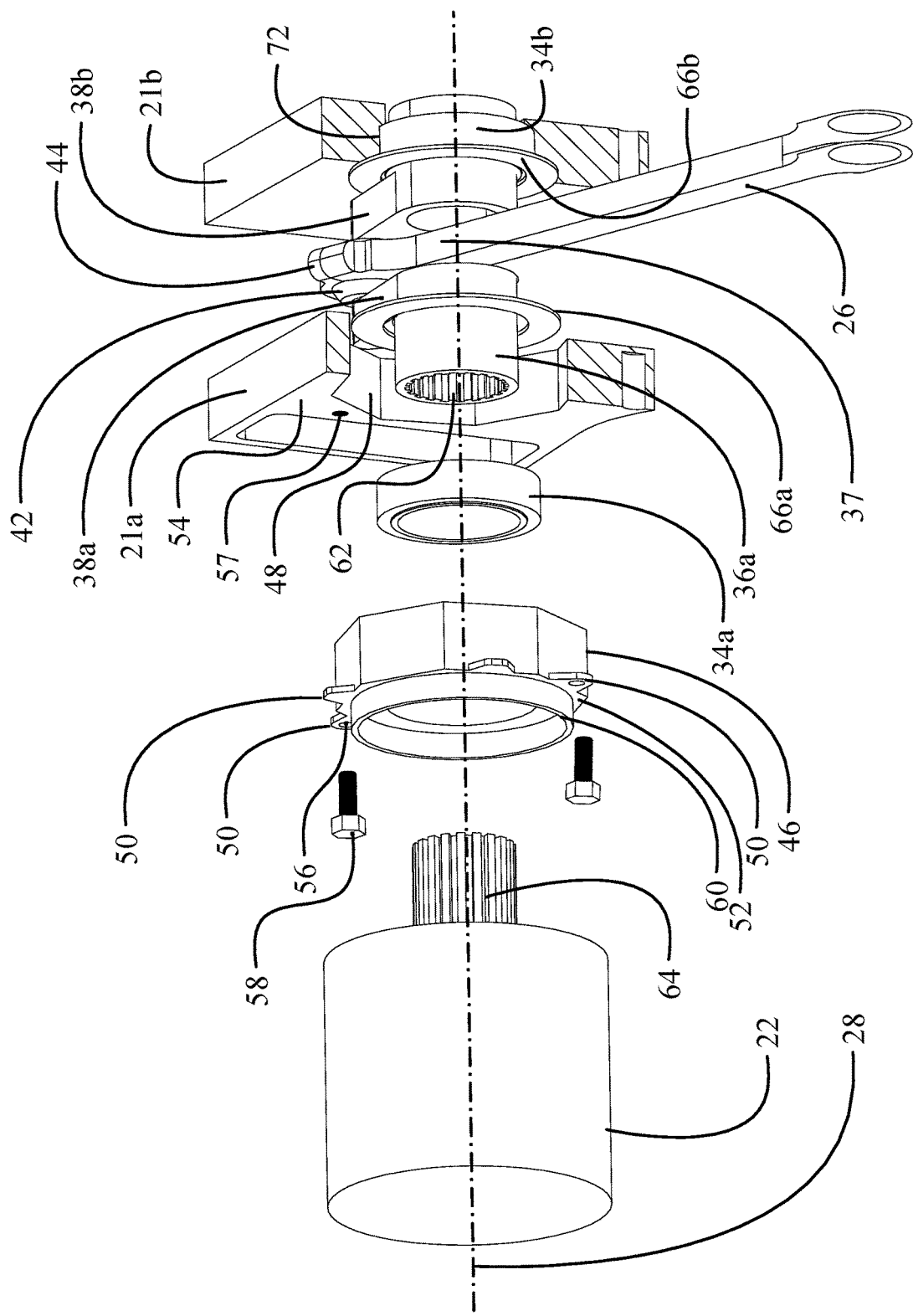
FIG. 5 is a partially exploded rear pictorial view showing assembly sequence.

As seen in greater detail in FIGS. 3, 4 and 5, with the outboard rib 21*b* removed for clarity and actuator 22 exploded along a rotation axis 28 of the crankshaft 24 in FIG. 3, the crankshaft 24 is supported by inboard roller bearing 34*a* and outboard roller bearing 34*b* (seen in FIG. 5) for rotation about the axis 28. The inboard and outboard roller bearings 34*a*, 34*b* are disposed in the inboard and outboard ribs, 21*a*, 21*b*. FIG. 4 shows details of the crankshaft 24 which configured for over center rotation and incorporates an inboard journal 36*a* axially spaced from an outboard journal 36*b*. The inboard and outboard roller bearings 34*a*, 34*b* are configured to be rotatably received in the inboard and outboard journals 36*a*, 36*b*, respectively. Aligned inboard crank arm 38*a* and outboard crank arm 38*b* extend from the inboard journal 36*a* and outboard journal 36*b*, respectively for rotation about the axis 28. A crank pin 40 is connected between the inboard and outboard crank arms 38*a*, 38*b* bridging a rod gap 37 between the spaced apart inboard and outboard crank arms 38*a*, 38*b* and the inboard and outboard journals 36*a*, 36*b*. Actuating rod 26 is rotatably attached at a first end 25 to the crank pin 40 with a split ball bearing 42 with a rod cap 44 configured to secure the split ball bearing 42 and actuating rod to the crank pin 40. The rod gap 37 allows a forward portion 45 of the actuating rod 26 to pass through the axis 28 of the inboard and outboard journals 36*a*, 36*b* for over center rotation of the crankshaft 24.

At least one of the inboard and outboard roller bearings (inboard roller bearing 34*a* in the example) is supported in a reaction ring 46 which is received in a mating aperture 48 in the respective inboard or outboard rib (inboard rib 21*a* in the example as seen in FIG. 5). The reaction ring and associated roller bearing may be present in either the inboard or outboard rib or both. The reaction ring 46 is multi-faceted, keyed or scalloped to engage the mating aperture 48 to react torsion imposed by the inboard journal 36*a* and inboard roller bearing 34*a*. For the example shown, an octagonal interface is employed. A flange or plurality of extensions 50 on an exterior surface 52 of the reaction ring 46 are received against a support surface 54 of the inboard rib 21*a*. One or more of the extensions 50 incorporate holes 56 to receive fasteners 58 extending into the support surface 54 to retain axial loads induced by the inboard journal 36*a* and inboard roller bearing 34*a*. A cylindrical flange 60 extends axially outward from the reaction ring 46 to engage a mating slot in the actuator 22 for mounting. The cylindrical flange 60 and mating slot is splined or keyed to react torsional loads of the actuator. As seen in FIG. 3, the inboard journal 36*a* has an internal spline 62 to mate with an output shaft 64 of the actuator 22.

Inboard and outboard rub pads 66*a*, 66*b* are engaged between the inboard crank arm 38*a* and an inner surface 68 of the reaction ring 46 and the outboard crank arm 38*b* and an inboard surface 70 of the outboard rib 21*b* to accommodate side loads and prevent adverse frictional wear between the crankshaft 24 and the inboard and outboard ribs 21*a*, 21*b*.

The configuration of the implementation shown in the drawings allows assembly of the crankshaft 24 and supporting elements from one side. With FIG. 5 as a reference, the outboard roller bearing 34*b* is inserted in a receiving aperture 72 in the outboard rib 21*b*. The outboard rub pad 66*b*, crankshaft 24, inboard rub pad 66*a*, the inboard roller bearing and the reaction ring 46 are configured to be sequentially received through the mating aperture 48. The outboard rub pad 66*b* is received over the outboard journal 36*b* and the crankshaft 24 is then inserted through mating aperture 48 with the outboard journal 36*b* received in the outboard roller bearing 34*b*. The mating aperture 48 has a diameter configured to receive the crankshaft 24 with the extending inboard and outboard crank arms 38*a*, 38*b*. The inboard rub pad 66*a* is then received over the inboard journal 36*a* through the mating aperture 48. The inboard roller bearing 34*a* (either before or after insertion into the reaction ring 46) is received over the inboard journal 36*a* and the reaction ring 46 is received in the mating aperture 48. Fasteners 58 are inserted through holes 56 to secure the retaining ring to the inboard rib 21*a*. The actuating rod 26, split ball bearing 42 and rod cap 44 are secured to the crank pin 40 and the actuator 22 is received on the cylindrical flange 60 with the output shaft 64 received in the internal spline 62 of the inboard journal 36*a*. The crankshaft 24 is trapped by the roller bearings 34*a*, 34*b* and rub pads 66*a*, 66*b* and does not require any securing nut, washer, bushings or spacers. In an alternative implementation, both the inboard and outboard roller bearings 34*a*, 34*b* are supported in a reaction ring 46 with the reaction rings received in mating apertures in both the inboard and outboard ribs 21*a*, 21*b* and assembly may occur from either or both sides.

Figure 6A:
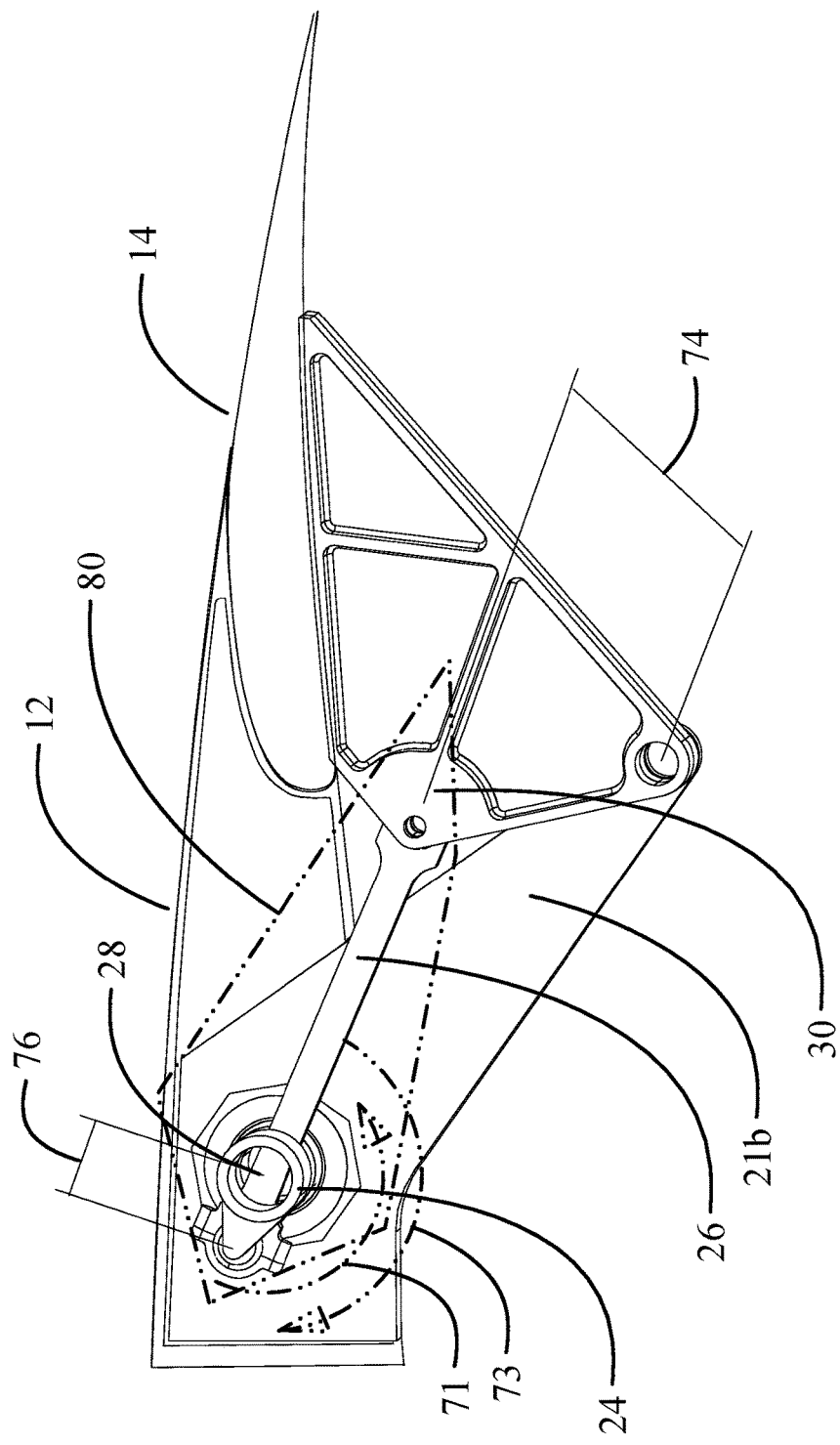
FIG. 6A is a side view of the flap actuation mechanism in the stowed position with inboard rib of the underwing structure removed for clarity.
Figure 6B:
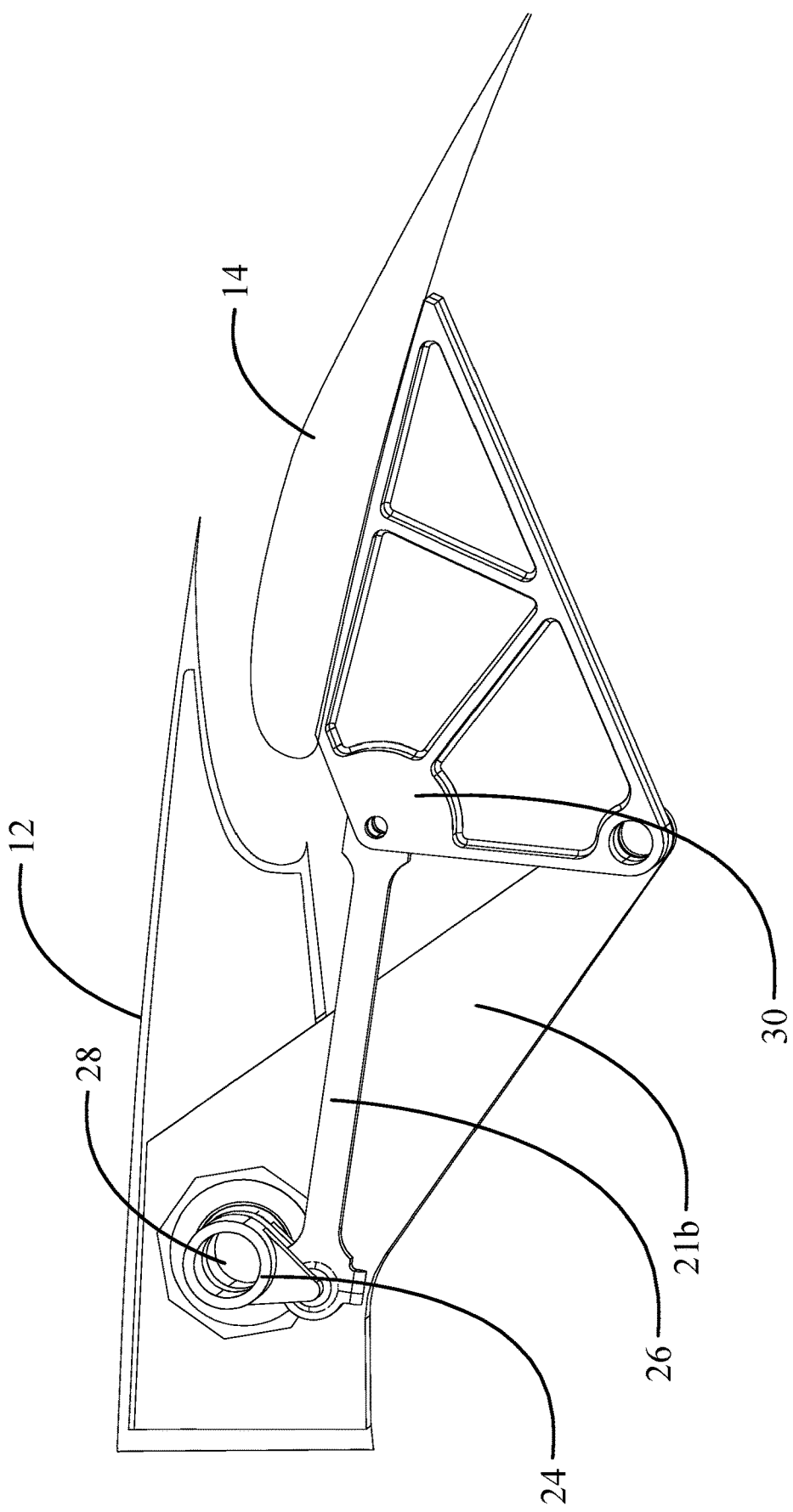
FIG. 6B is a side view of the flap actuation mechanism in a partially extended position with inboard rib of the underwing structure removed for clarity.
Figure 6C:
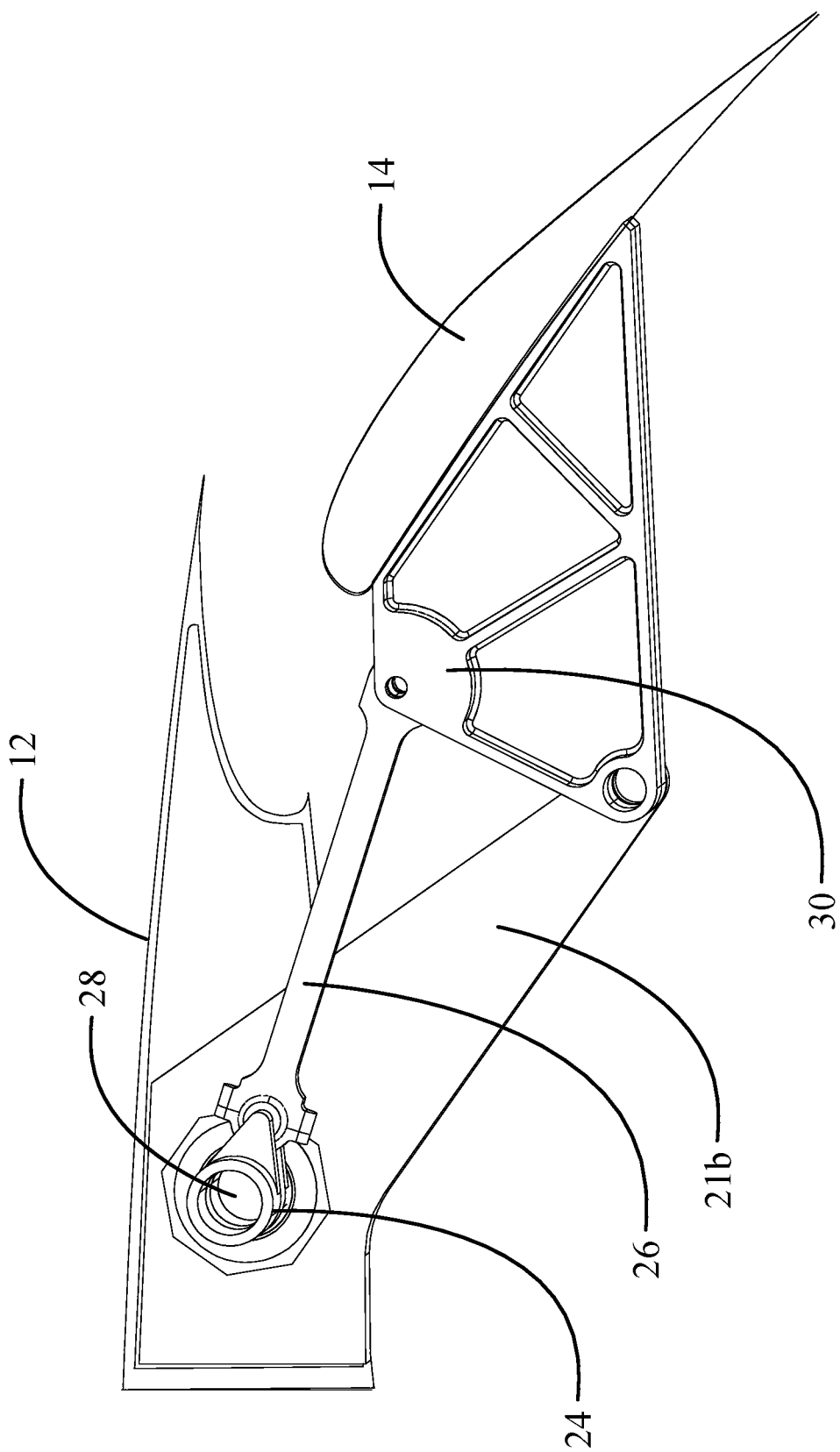
FIG. 6C is a side view of the flap actuation mechanism in the fully deployed position with inboard rib of the underwing structure removed for clarity.
Figure 6D:
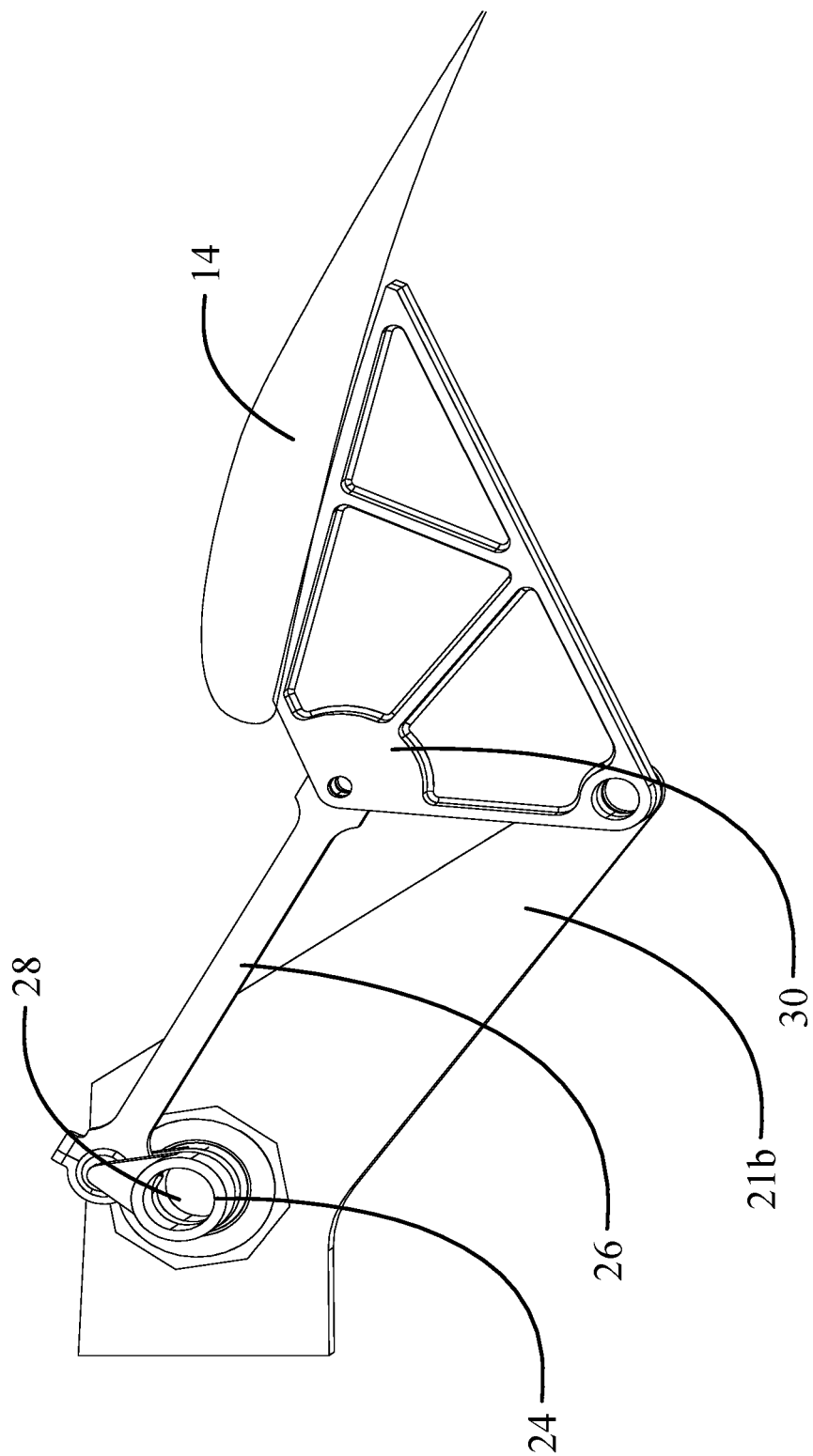
FIG. 6D is a side view of the flap actuation mechanism in the overtravel or partial reverse extension position with inboard rib of the underwing structure removed for clarity.
Figure 7:
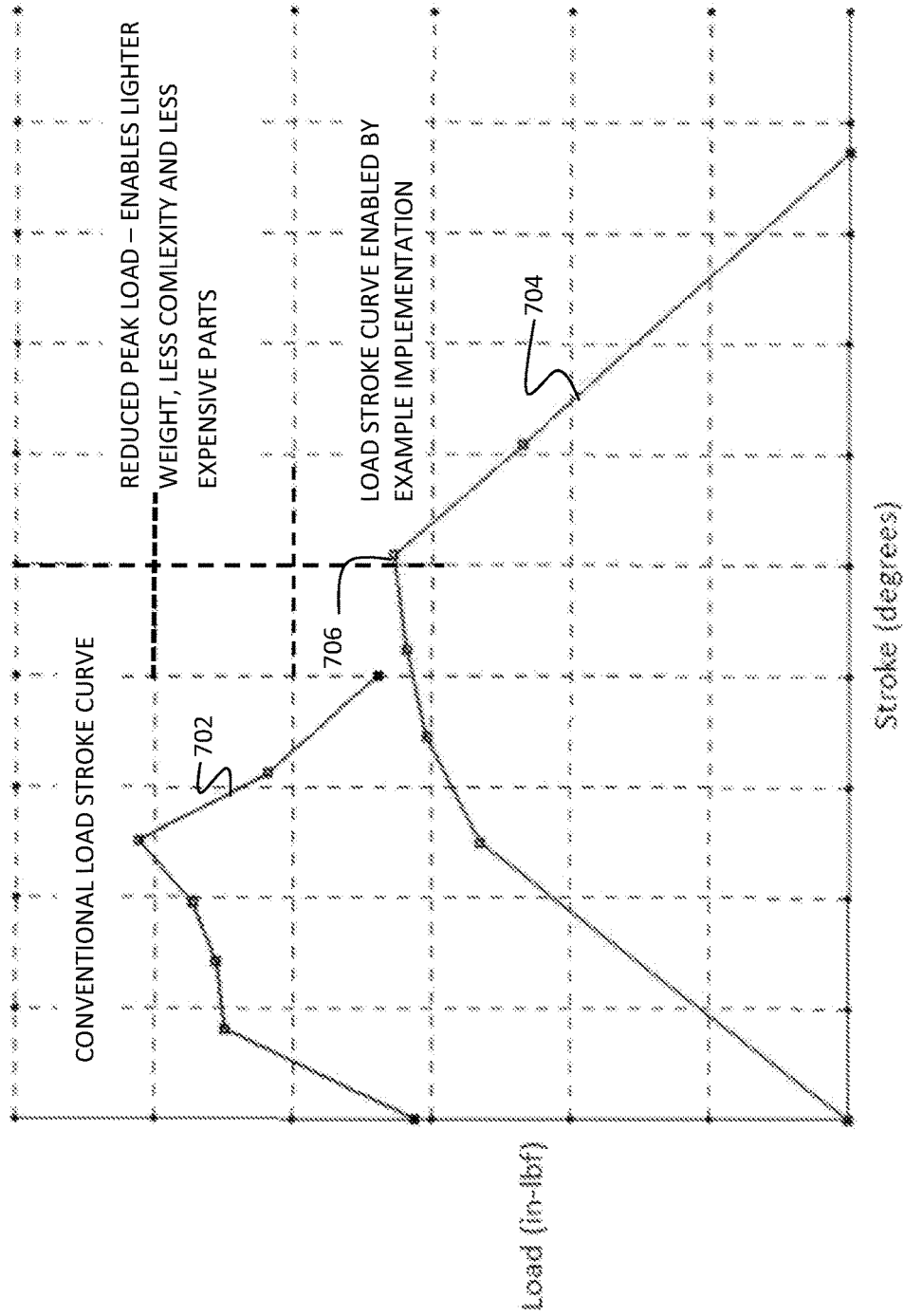
FIG. 7 is a load graph showing a convention load stroke curve and the load stroke curve associated with the example implementation; and, FIG. 8 is a flow chart of a method for flap deployment using the exemplary implementation.

As seen in FIGS. 6A-6D, the flap 14 is deployed by the flap bracket 30 driven by the actuating rod 26. The flap bracket 30 is pivotally coupled to the underwing structure 20 with axle 32 engaged in the inboard and outboard ribs 21*a*, 21*b*. The flap in the stowed position is seen in FIG. 6A with the actuating rod substantially aligned with the rotation axis. Rotation of the crankshaft 24 is induced by the rotary actuator 22 over a range of extension from the stowed position to a deployed position. Extension of the flap to a partially deployed position is shown in FIG. 6B with rotation of the actuator and crankshaft 24 in a first direction 71 (counterclockwise for the example shown). The fully deployed position is shown in FIG. 6C with rotation of the crankshaft by substantially 180°. Avoidance of any collision of actuating elements is provided by clearance of the actuating rod 26 in the rod gap 37 between the inboard and outboard crank arms 38*a*, 38*b* and inboard and outboard journals 36*a*, 36*b* in the crankshaft 24. Retraction of the flap may be accomplished by rotation of the actuator 22 and crankshaft 24 in a reverse direction 73 (clockwise for the example shown). The second end 27 of the actuating rod 26 is coupled to the flap bracket 30 with the pivot pin 29 at a predetermined distance 74 from the pivotal coupling at axle 32, as seen in FIG. 6B, and the inboard and outboard crank arms 38*a*, 38*b* have an arm length 76 that is not less than a predetermined fraction of the predetermined distance to provide a mechanical advantage to the linear force applied via the actuating rod with respect to actuator input torque to rotate the flap. The predetermined distance is defined based on fowler effect expected of the flap 14 and trailing edge cove space available in the wing 12 adjacent the underwing support 20 with the overall mechanism design as compact as possible to reduce volume requirements of the trailing edge cove, fairing protrusion outside of the wing loft, and overall weight of the mechanism. In the exemplary implementation, the predetermined fraction is not less than ¼ and nominally between ¼ and ⅓. The substantially full 180° stroke length allowed by the over center capability of the crankshaft 24 reduces the magnitude of the peak 706 of the actuator load vs. stroke (as determined by degrees of rotation) as seen in FIG. 7 wherein a convention load stroke curve 702 is shown with a load stroke curve 704 of the example implementation.

The configuration of the crankshaft 24 allows 360° of rotation. The over center capability of the crankshaft 24 with respect to actuating rod 26 allows the length of the crank arms 38a, 38b to be shorter than in existing flap deployment systems where rotation of the lever arm driving the actuating rod is angularly limited since the lever arm cannot be retracted over center without interference of the actuating rod. Additionally, allowing rotation of the crankshaft 24 over center may eliminate the requirement for any 'overtravel stop feature' which prevents collision of parts which could occur if the actuator were to over drive in existing flap deployment systems. Further, continued rotation of the crankshaft 24 in the original direction from the fully deployed position as shown in FIG. 6D will result in retraction of the flap 14 if sufficient internal clearance in the wing is available as represented by the kinematic sweep zone 80. In addition, depending on the initial angular relationship of the rotation axis 28 of the crankshaft 24, the pivot pin 29 and the axle 32 in the flap bracket 30, the extension/retraction profile may differ with clockwise and counterclockwise rotation of the crankshaft 24 as indicated by the kinematic sweep zone 80. Counterclockwise rotation of the crankshaft 24 from the stowed position of the flap 14 provides a greater range of deployment of the flap 14 in substantially the first 90° of rotation from the fully retracted position with reducing incremental deployment over the range from substantially 90° to 180°. Clockwise rotation of the crankshaft 24 from the retracted position provides a reduced range of deployment of the flap from 0° to substantially 270° with increased incremental deployment over the range from substantially 270° to 180°. This feature provides operational flexibility for flap deployment or retraction in various flight profiles.

Figure 8:
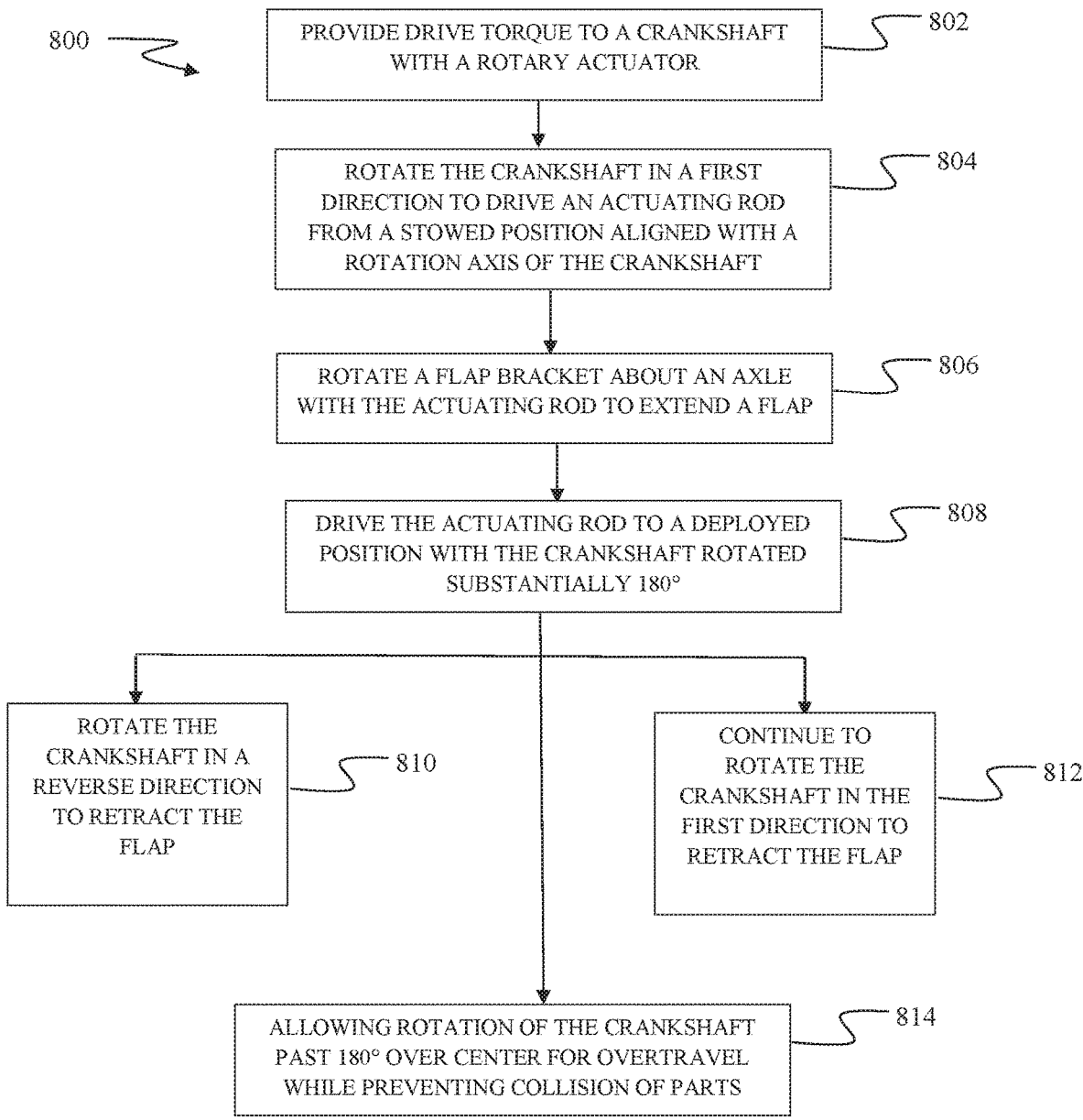

The implementation described herein provides a method 800 for deployment of a flap as shown in FIG. 8. Drive torque is provided to a crankshaft 24 with a rotary actuator 22, step 802. The crankshaft 24 is rotated in a first direction to drive an actuating rod 26 from a stowed position substantially aligned with a rotation axis 28 of the crankshaft 24, step 804. A flap bracket 30 is rotated about an axle 32 with the actuating rod to extend a flap 14, step 806. Rotation of the crankshaft includes driving the actuating rod to a deployed position with the crankshaft 24 rotated substantially 180°, step 808. The crankshaft 24 may then be rotated in a reverse direction to retract the flap, step 810. Alternatively, continuing to rotate the crankshaft 24 in the first direction from 180° to 360°, step 812 may also be employed to retract the flap 14. Allowing rotation of the crankshaft past 180° over center eliminates the requirement for any 'overtravel stop feature' while preventing collision of parts, step 814.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

What is claimed is:

1. A flap actuation mechanism, comprising:
   a flap bracket attached to a flap and coupled to an underwing structure with a pivotal coupling;
   a crankshaft configured for over center rotation having aligned inboard and outboard crank arms extending from axially spaced inboard and outboard journals disposed in the underwing structure and configured to rotate about a rotation axis of the inboard and outboard journals;
   a crank pin connected between the inboard and outboard crank arms; and,
   an actuating rod, having a first end rotatably coupled to the crank pin and a second end coupled to the flap bracket, wherein rotation of the crankshaft displaces the actuating rod to cause rotation of the flap bracket and the flap.

2. The mechanism of claim 1, wherein rotation of the crankshaft causes forward and aft movement of the actuating rod to cause rotation of the flap bracket and the flap between a stowed position and a deployed position.

3. The mechanism of claim 1, wherein the inboard and outboard journals are spaced apart such that, during rotation of the crankshaft, a forward portion of the actuating rod can pass through the rotation axis and between the inboard and outboard journals.

4. The mechanism of claim 1, wherein the second end of the actuating rod is coupled to the bracket at a predetermined distance from the pivotal coupling, and the inboard and outboard crank arms have an arm length that is not less than ¼ of the predetermined distance.

5. The mechanism of claim 1, wherein a drive torque applied for rotation of the crankshaft is translated into an applied linear force by the actuating rod to the flap bracket to cause rotation of the flap between a stowed position and a deployed position.

6. The mechanism of claim 5 wherein one of the inboard and outboard journals has an internal spline and a rotary actuator supplies the drive torque, said rotary actuator having an output shaft configured to engage the internal spline.

7. The mechanism of claim 6, wherein a second end of the actuating rod is coupled to the flap bracket at a predetermined distance from the pivotal coupling, and the inboard and outboard crank arms have an arm length that is not less than a predetermined fraction of the predetermined distance to provide a mechanical advantage between actuator force and the applied linear force of the actuating rod to rotate the flap.

8. The mechanism of claim 1 wherein the actuating rod is coupled to the crank pin with a split bearing and the actuating rod includes a rod cap configured to secure the split bearing and actuating rod to the crank pin.

9. The mechanism of claim 1 further comprising inboard and outboard roller bearings configured to receive the inboard and outboard journals, said inboard roller bearing disposed in the inboard and outboard ribs.

10. The mechanism of claim 9 further comprising at least one reaction ring received in a mating aperture in one of the inboard and outboard ribs and one of said inboard and outboard roller bearings is received in the at least one reaction ring.

11. The mechanism of claim 10 further comprising an inboard rub pad engaged between the inboard crank arm and an inner surface of the at least one reaction ring and an outboard rub pad engaged between the outboard crank arm and an inboard surface of the outboard rib.

12. The mechanism of claim 11 wherein the mating aperture has a diameter configured to receive the crankshaft within the inboard and outboard crank arms.

13. The mechanism of claim 12 wherein the outboard roller bearing is inserted in a receiving aperture in the outboard rib and the outboard nib pad, crankshaft, inboard rub pad, the inboard roller bearing and the at least one reaction ring are configured to be sequentially received through the mating aperture.

14. The mechanism of claim 10 wherein the at least one reaction ring is multi-faceted, keyed or scalloped to engage the mating aperture to react torsion.

15. The mechanism of claim 14 wherein the at least one reaction ring is octagonal.

16. An operating flap system for an aircraft, said system comprising:
   a wing having an underwing flap support element comprising an underwing structure including an inboard rib and an outboard rib forming a clevis having a slot;
   a flap bracket attached to a flap and rotatably coupled to the underwing structure with an axle extending between the inboard and outboard ribs;
   a crankshaft configured for over center rotation having aligned inboard and outboard crank arms extending from axially spaced inboard and outboard journals configured to rotate about a rotation axis, said inboard journal having an internal spline;
   a crank pin connected between inboard and outboard crank arms;
   inboard and outboard roller bearings configured to receive the inboard and outboard journals, said outboard roller bearing disposed in a receiving aperture in the inboard rib;
   a reaction ring received in a mating aperture in the inboard rib said inboard roller bearing received in the reaction ring, said reaction ring being multi-faceted, keyed or scalloped to engage the mating aperture to react torsion, said reaction ring having a keyed or splined cylindrical flange;
   an inboard rub pad engaged between the inboard crank arm and an inner surface of the reaction ring and an outboard rub pad engaged between the outboard crank arm and an inboard surface of the outboard rib;
   a rotary actuator received on the splined cylindrical flange and having an output shaft configured to engage the internal spline; and,
   an actuating rod extending through the slot and having a first end rotatably coupled to the crank pin with a split ball bearing secured with a rod cap and a second end coupled to the flap bracket, wherein rotation of the crankshaft displaces the actuating rod from a stowed position aligned with the rotation axis over a range of extension to a deployed position with the crankshaft rotated substantially 180° causing rotation of the flap bracket and the flap.

17. A method for deployment of a flap, said method comprising:
   providing drive torque to a crankshaft;
   rotating the crankshaft in a first direction to drive an actuating rod from a stowed position wherein the actuating rod is aligned with a rotation axis of the crankshaft, said actuating rod having a first end rotatably coupled to a crank pin of the crankshaft and a second end coupled to a flap bracket, wherein rotation of the crankshaft displaces the actuating rod to cause rotation of the flap bracket and the flap; and,
   rotating the flap bracket with the actuating rod to extend a flap.

18. The method of claim 17 wherein the step of rotating the crankshaft includes driving the actuating rod to a deployed position with the crankshaft rotated substantially 180°.

19. The method of claim 18 further comprising continuing to rotate the crankshaft in the first direction from 180° to 360° to retract the flap.

20. The method of claim 17 further comprising rotating the crankshaft in a reverse direction to retract the flap.

* * * * *